No. 11,845. Reissued Aug. 14, 1900.
J. H. HANLON.
PNEUMATIC DEVICE FOR CLEARING RAILWAY TRACK SANDING PIPES.
(Application filed May 26, 1900.)
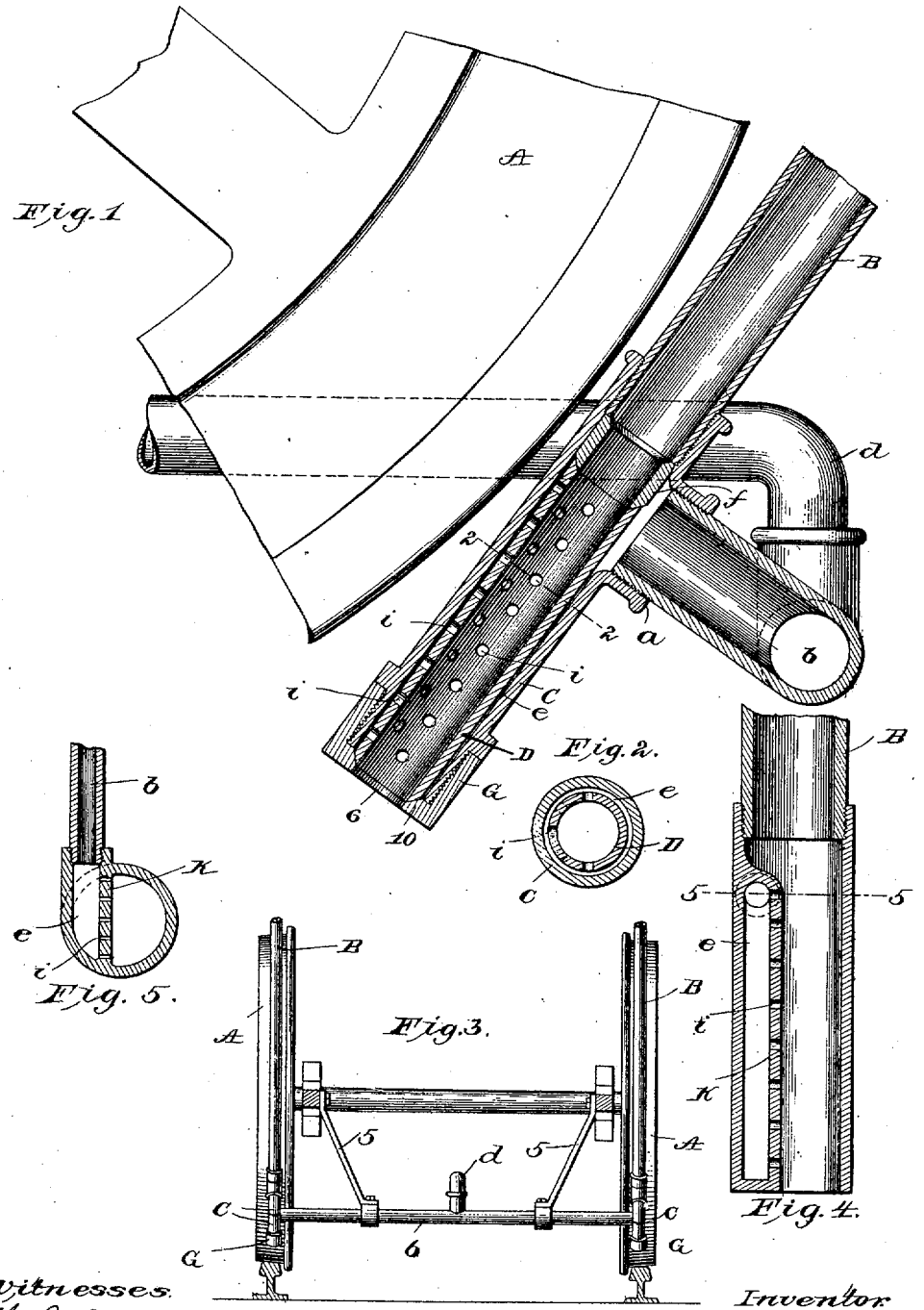
Witnesses.
W. C. Sinsford.
Fred S. Grumbof.
Inventor.
John Henry Hanlon,
by Crosby & Gregory
Attys.
THE NORRIS-PETERS CO., PHOTO-LITHO., WASHINGTON, D.C.

UNITED STATES PATENT OFFICE.

JOHN HENRY HANLON, OF BOSTON, MASSACHUSETTS, ASSIGNOR OF ONE-HALF TO WILLIAM JAMES HANLON, OF FITCHBURG, MASSACHUSETTS.

PNEUMATIC DEVICE FOR CLEARING RAILWAY-TRACK-SANDING PIPES.

SPECIFICATION forming part of Reissued Letters Patent No. 11,845, dated August 14, 1900.

Original No. 633,193, dated September 19, 1899. Application for reissue filed May 26, 1900. Serial No. 18,171.

*To all whom it may concern:*

Be it known that I, JOHN HENRY HANLON, a citizen of the United States, residing at Boston, in the county of Suffolk and State of Massachusetts, have invented a Pneumatic Device for Clearing Railway-Track-Sanding Pipes, of which the following is a specification.

My invention relates to mechanism for sanding rails, and has for its object to prevent the tip or delivery end of the sand-pipe from becoming clogged or obstructed by the packing of the sand at this point, which frequently happens by reason of moisture collecting on the inside of the pipe at the tip, which dampens the sand and causes it to stick to the moist surface, thereby clogging the outlet or discharge opening and preventing the passage of the sand to the rail. To overcome this difficulty is the object of my invention, which consists in a novel device whereby a blast of air is introduced within the tip or outlet of the sand-pipe to clear the same, if obstructed, as hereinafter more fully set forth.

In the accompanying drawings, Figure 1 is a central vertical section of the lower portion of a locomotive track-sanding pipe having my pneumatic clearing tip or nozzle applied thereto. Fig. 2 is a cross-section on the line 2 2 of Fig. 1. Fig. 3 is a diagram representing the manner in which the tips or lower ends of the two sand-pipes on opposite sides of a locomotive or car are connected by a transverse braced pipe communicating with the compressed-air pipe. Fig. 4 is a longitudinal section of a modified form of my tip or nozzle. Fig. 5 is a section on the line 5 5 of Fig. 4.

In the said drawings, A represents a portion of one of the driving-wheels of a locomotive or car, and B the track-sanding pipe, placed, as usual, in front of the said wheel. To the lower end of the pipe B is screwed a tip or nozzle, through which the sand is delivered to the rail beneath, said tip consisting of a tubular shell or casing C, containing a delivery-passage for the sand. In Fig. 1 the tube C has on one side a branch inlet *a*, into which is screwed a pipe *b*, extending across to and connected with a similar tip or nozzle on the opposite side of the locomotive or car, as shown in Fig. 3, the pipe *b* being connected at any desired portion of its length with a compressed-air-supply pipe *d*, leading from the main reservoir and under control of the engineer, whereby air is supplied to both tips at the same time. The crossover-pipe *b* is connected with the frame of the engine or car by means of suitable braces 5, whereby the two sand-pipes are held securely in the proper position, with their tips or nozzles directly in line with the rails.

Within the outer casing C is placed an inner tube D of such diameter as to leave an air space or chamber *e* between it and the interior of the casing C, said chamber being in communication with the inlet *a* and with the air-pipe *b*, a washer *f* being interposed between the sand-pipe B and the tube D. The bottom of the casing C has screwed upon it a ring G, having a central aperture 6 of the same diameter as the interior of the tube D, said ring having a beveled recess 10, forming a seat for the reception of the correspondingly-beveled end of the tube D, which is thus supported and held securely in place, its upper end being inwardly beveled and fitted over the correspondingly-beveled lower end of the washer *f*, thus preventing all leakage of air. The upper end of the washer *f* bears against the lower end of the sand-pipe B, as shown in Fig. 1. The inner tube D is provided with a plurality of air passages or perforations *i*, preferably on the upper side or half only, said perforations affording a passage for the entrance into the interior of the tube D of an air-blast, the air admitted through a plurality of perforations serving to effectually clear said tube in case it should have become clogged or obstructed by the packing of the sand by reason of its having become wet or damp from moisture collected on the inside of the tube or from other cause, an event of frequent occurrence in the ordinary sand-pipes, which has caused many accidents, owing to the impossibility of applying sand to the rails at the instant required. It will be seen that the perforations *i*, which may be of any suitable shape, cause the air-blast to be uniformly distributed from the top to the bottom of the tube D, thus clearing all parts of the tube and insuring a free delivery of the sand to the rail at the desired instant. If the perforations *i* extended around on all sides of the tube D, those on the lower side or farthest from the wheel A would be liable to become obstructed by the lodgment of sand therein, owing to the inclination of the end of the sand-pipe to correspond to the curvature of the periphery of the wheel A. Hence I prefer to place these perforations only on the inner half of the circumference of the tube D, as shown, whereby the best results are obtained.

By connecting the two sand-pipes by means of a crossover air-pipe *b*, extending from one tip or nozzle to the other and held by braces, as shown, a great advantage is gained, as all liability of one of the pipes being bent out of line with its rail while the other remains in place is avoided and the consequent danger of supplying one rail with sand and not the other effectually prevented, the latter being often the cause of strain or breakage of the machinery.

Instead of providing the tip or nozzle with an air space or chamber formed between an outer shell or casing and an inner perforated tube, as above described, the nozzle may be formed of a single tube, as shown in Figs. 4 and 5, having a partition *k* extending across its interior, forming an air space or chamber *e*, adjoining the sand outlet or passage and on one side only of the same, said partition being provided with perforations *i*, through which the air may pass from the air-chamber *e* to the sand-passage in the same manner as in the tip first described. The air-chamber *e* is closed at the top and bottom, as shown, and is connected with the air-pipe *b*, whereby it is supplied with air at the required times.

What I claim as my invention, and desire to secure by Letters Patent, is—

1. In a track-sanding device, a sand-pipe having a discharging tip or nozzle provided with an air-chamber opening into said tip throughout its length, whereby air forced into said chamber will enter and clear the tip of sand.

2. In a track-sanding device, a sand-pipe having a discharging tip or nozzle provided with an air-chamber having a series of holes leading into said tip or nozzle to discharge air from said chamber in a plurality of streams into said tip or nozzle, said air cleaning the nozzle and preventing the adherence thereto of sand.

3. In a track-sanding device, a sand-pipe, a tip or nozzle at one end thereof presenting an inner perforated wall at one side of the tip-passage [illegible]ing the other side imperforate or smo[illegible] [illegible]aid tip presenting an air-chamber at the [illegible]osite side of said perforated wall where[illegible]y air forced into said chamber and through said perforations may impinge directly against the imperforate side of the tip-passage.

4. In a track-sanding device, the combination with the sand-pipe, of a tip or discharge-nozzle consisting of an outer shell or casing adapted to be connected with a pipe for containing air under pressure, and an inner perforated tube open at both ends, and forming the discharge-outlet for the sand, said perforated tube being arranged within the outer casing to form an air space or chamber between the two, whereby the air is caused to pass from the air-chamber through the perforations of the inner tube, to keep said tube free and clear for the passage of sand to the rail, substantially as described.

5. A sand-pipe tip or discharge-nozzle for track-sanding devices, comprising an outer tubular member adapted to be connected with a pipe for containing air under pressure, an inner tubular member open at both ends, and arranged within the outer member to form an air space or chamber between said two members closed at the top and bottom, said inner tubular member forming the outlet or discharge pipe for conducting the sand to the rail, and having perforations on one side for the passage of the air from the air-chamber to its interior, substantially as described.

6. The combination with a track-sanding pipe, of a tip or nozzle secured to the lower end of the same, said tip consisting of an outer tubular shell or casing having on one side a branch connection with a pipe for containing air under pressure, an inner perforated tube arranged within the outer casing to form an air space or chamber between the two, a washer interposed between the bottom of the sand-pipe and the adjacent end of the inner perforated tube to close the top of the air-chamber, and a ring fitted to the bottom of the tube, and having a seat for receiving the lower end of the inner tube, said ring closing the bottom of the air-chamber, and having a central aperture for the passage of the sand to the rail, substantially as described.

7. In a track-sanding device, the combination with two track-sanding pipes, each having a tip or nozzle provided with a delivery passage or outlet for the sand, and an adjoining air space or chamber having its wall perforated for the passage of the air from the air-chamber to the sand-passage, of an air-pipe extending from one tip to the other, and connecting their air-chambers, said connecting-pipe bracing and holding the tips in position over the rails, and being connected with a compressed-air-supply pipe, substantially as described.

JOHN HENRY HANLON.

Witnesses:
GEO. W. GREGORY,
M. A. DUNN.